United States Patent Office.

JOHN PICKLES, OF WIGAN, ENGLAND, ASSIGNOR TO JAMES FOLEY, JOHN T. HARRIS, AND WILLARD W. HARRIS, OF MONTROSE, CANADA.

Letters Patent No. 96,345, dated November 2, 1869.

IMPROVED SOLID OR DRY EXTRACT OF BARK FOR TANNING, &c.

The Schedule referred to in these Letters Patent and making part of the same.

To all whom it may concern:

Be it known that I, JOHN PICKLES, of Wigan, in the county of Lancaster, England, have invented a new and improved article of manufacture, to wit, a Solid or Dry State of the Extract of Bark; and I, hereby declare the following to be a full, clear, and exact description thereof, which will enable others to make and use my invention.

Letters Patent of the United States have already been granted to me for a machine and process for extracting the tanning-properties of bark, &c., in a liquid or semi-liquid form, and then for reducing the same to a solidified state, or dry state.

The purpose of this change of form and consistency of the said extract is to render the said extract more convenient for transportation, and to render it, while being thus transported, and placed, possibly, contiguous to other articles of commerce and merchandise, less liable, indeed, not liable at all, to stain, deface, and injure such goods with which it may be loaded or packed.

In the liquid form it is a very unsafe article to ship or transport, in consequence of the fact that it will, if its receptacle breaks or leaks, stain every article with which it comes in contact.

In view of this, and of the fact that bark itself, in its normal condition, is very bulky, it becomes a great desideratum, in transportation and export, to have the extract removed from the bulky and inconvenient substance in which it resides, and at the same time render it innocent and harmless to other goods with which it may be associated in shipment.

The process I do not here claim, consisting, as it does, of the steps before patented by me, to wit, leaching the bark, removing the liquid extract, keeping the said extract from the effects of exposure to the atmosphere, concentrating the same in a drier or heater, and then reducing the semi-liquid concentrated extract to a dry or crystallized state, in which latter condition, as an article of new manufacture, I desire to secure Letters Patent upon it.

The dry extract can be packed in bags or boxes.

It is, of course, much lighter than in liquid form, and moreover the extract is, in addition, in a concentrated state.

For use it requires the commingling of a proper quantity of water, and can then be applied to the leather. When moistened, it can be used as a mordant for dyers' and printers' use, and for all of such purposes is cheap and easily handled.

This article is the product of the process and machine before this patented by me.

What I claim as my invention, and desire to secure by Letters Patent, is—

As an article of new manufacture, the liquid or semi-liquid extract of bark, when reduced to a powdered condition or dry state, substantially in the manner and for the purposes herein described.

JOHN PICKLES.

Witnesses:
 JNO. NICHOLLS,
 WM. F. LIGHTHALL.